United States Patent Office 3,133,241
Patented May 12, 1964

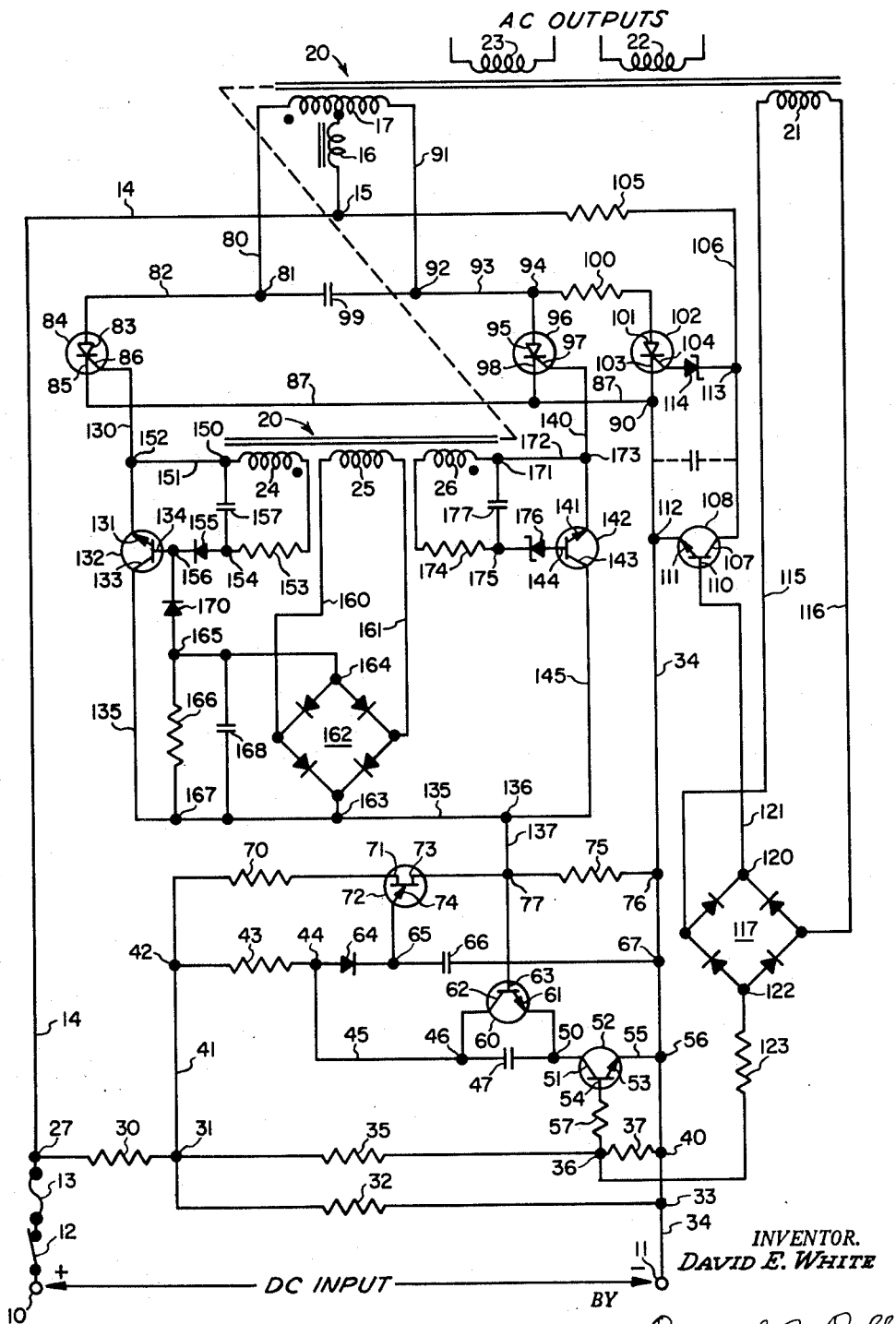

3,133,241
SEMICONDUCTOR INVERTER CIRCUIT WITH MEANS TO PRESET THE CORE FLUX OF THE TRANSFORMER
David E. White, St. Paul, Minn., assignor to Minneapolis-Honeywell Regulator Company, Minneapolis, Minn., a corporation of Delaware
Filed Aug. 28, 1961, Ser. No. 134,294
15 Claims. (Cl. 321—45)

This invention relates generally to power supplies for converting D.C. to A.C. and more specifically to a controlled rectifier power oscillator inverter circuit for converting D.C. power to A.C. power. Circuits using controlled rectifiers for power conversion from D.C. to A.C. are not new; however, certain problems existing in utilizing these devices, one of which is that of insuring the oscillator is started in the proper phase such that the output transformer, which may have residual flux left in the core from the previous operation, will not be started in the same direction. If this condition is not prevented, the output transformer may saturate before the first half cycle completion, which in turn prevents the commutating capacitor from having a sufficient charge thereacross to cause proper switching. This invention utilizes a novel circuit to preset the core and to direct the initial triggering of the correct controlled rectifier to initiate proper sequencing to sustain oscillation.

It is an object of this invention to provide an improved controlled rectifier power inverter circuit for converting D.C. power to A.C. power.

It is a more specific object of this invention to provide an improved starting circuit for a controlled rectifier oscillator power supply to insure correct starting sequence of the power supply.

These and other objects of the invention will become more apparent upon further consideration of the specification, claims and drawing of which the single figure is a schematic representation of the preferred embodiment of my invention.

Referring now to the drawing, there is disclosed a pair of D.C. input terminals 10 and 11 to which is connected a suitable D.C. source, such as for example, 100 volts D.C. In the circuit shown, the terminal 10 is positive with respect to the terminal 11. Positive terminal 10 is connected through a switch 12 and a suitable fuse 13 to a conductor 14. A junction 15 on the terminal 14 is connected through a coil 16 to the centertap of a primary winding 17 of a power output transformer 20. Transformer 20 also includes output means shown as a plurality of secondary windings 21 through 26. A voltage divider network may be traced from a terminal 27 on the conductor 14 through a resistor 30, a junction 31, and a resistor 32 to a junction 33 on a negative conductor 34 which is connected to terminal 11. A further path can be traced from the junction 31 through a resistor 35, a junction 36, and a resistor 37 to a junction 40 on the negative conductor 34. A further circuit may be traced from the junction 31 through a conductor 41, a junction 42, a resistor 43, a junction 44, a conductor 45, a junction 46, a capacitor 47, a junction 50, a collector electrode 51 of an NPN transistor 52, which transistor also includes an emitter 53 and a base 54, and from emitter 53 through a conductor 55 to a junction 56 on the negative conductor 34. A resistor 57 connects the base electrode 54 to the junction 36.

An NPN transistor 60 has an emitter electrode 61, a collector electrode 62 and a base electrode 63. The collector electrode 62 is connected to junction 46 and the emitter electrode 61 is connected to junction 50. A further path may be traced from the junction 44 through a diode 64, a junction 65, and a capacitor 66 to a junction 67 on the negative conductor 34. A resistor 70 connects the junction 42 to a base $b_2$ 71 of a uni-junction transistor (UJT) 72. The UJT 72 also includes a base $b_1$ 73 and an emitter 74. The base 73 is connected by means of a junction 77 and a resistor 75 to a junction 76 on the negative conductor 34.

The left-hand end of primary winding 17 of transformer 20 is connected by a conductor 80, a junction 81, and a conductor 82 to an anode or output electrode 83 of a controlled rectifier, here shown as a silicon controlled rectifier (SCR) 84. The SCR also includes an input electrode or cathode 85 and a control element or gate 86. The cathode 85 is connected by a conductor 87 to a junction 90 on the negative conductor 34. The right end of primary winding 17 is connected through a conductor 91, a junction 92, a conductor 93, and a junction 94, to an anode 95 of an SCR 96, which SCR also includes a cathode 98 and a gate 97. The cathode 98 is directly connected by the conductor 87 to the junction 90 on the negative conductor 34. A commutating capacitor 99 is connected between the junctions 81 and 92.

The junction 94 is also connected through a current limiting resistor 100 to current control means, here specifically the anode 101 of a third SCR 102, which SCR has a cathode 103 and a control element or gate 104. The function of SCR 102 is for initially presetting the core of transformer 20. The cathode 103 is directly connected to the negative conductor 34. The junction 15 is also connected through a resistor 105 and a conductor 106 to a collector electrode 107 of an NPN transistor 108, the transistor also including a base electrode 110 and an emitter electrode 111. The emitter electrode 111 is directly connected to a junction 112 on the conductor 34. A junction 113 on the conductor 106 is connected through a zener diode 114 to the gate electrode 104 of SCR 102.

Secondary winding 21 of transformer 20 is connected by a pair of conductors 115 and 116 to the input terminals of a full-wave diode rectifier 117. An output terminal 120 of the full-wave rectifier 117 is connected by a conductor 121 to the base electrode 110 of transistor 108. The opposite output terminal 122 of the full-wave rectifier is connected through a resistor 123 to the junction 36.

The gate electrode 86 of SCR 84 is connected by a conductor 130 to an emitter electrode 131 of an NPN transistor 132, which transistor also includes a collector electrode 133 and a base electrode 134. The collector 133 is connected by a conductor 135, a junction 136 and a conductor 137 to the junction 77. Similarly, the gate electrode 97 of SCR 96 is connected by a conductor 140 to an emitter electrode 141 of an NPN transistor 142, which transistor also includes a collector electrode 143 and a base electrode 144. The collector electrode 143 is connected by means of a conductor 145 to the junction 136. Left-hand terminal 150 of secondary winding 24 is connected by a conductor 151 to a junction 152 on the conductor 130. The right-hand terminal of the winding 24 is connected through a resistor 153, a junction 154, a diode 155, and a junction 156 to the base electrode 134 of transistor 132. A capacitor 157 is connected between the junctions 150 and 154.

Secondary winding 25 is connected by a pair of conductors 160 and 161 to the input terminals of a full-wave rectifier 162 which has one output terminal connected to a junction 163 on the conductor 135, the other output terminal 164 of the rectifier being connected through a junction 165 and a resistor 166 to a junction 167 on the conductor 135. A capacitor 168 is connected in parallel with the resistor 166. A diode 170 connects the junction 165 to the junction 156 at base electrode 134.

Right-hand terminal 171 of secondary winding 26 is connected by a conductor 172 to a junction 173 on the conductor 140. The left-hand terminal of the winding 26 is connected by means of a resistor 174, a junction 175 and a zener diode 176 to the base electrode 144 of transistor 142. A capacitor 177 interconnects the junctions 171 and 175.

Before considering the operation of the circuit above described, it is believed a further consideration of the problems solved by applicant is in order. The silicon controlled rectifiers 84 and 96 are alternately switched "on" to convert the D.C. supply to an A.C. voltage in winding 17. The resulting charge on the commutating capacitor 99 causes one SCR to be extinguished as the other is turned on. The initial starting of the SCR inverter poses a problem. The problem is that of starting the inverter in the proper phase such that the output transformer 20, which often has residual flux left in the core from the previous operation, is not started in the same direction. If thus started, the core may tend to saturate before the completion of the first half cycle of operation and under these conditions the commutating capacitor 99 will not have sufficient voltage thereacross to extinguish the conducting SCR when the other SCR is triggered on. Both SCR's would then be in a conducting state and oscillation would cease with probable damage to the apparatus occurring. As will be described in detail below, this invention utilizes a circuit for presetting the core of transformer 20 in a predetermined direction and for subsequently initially triggering the proper SCR to insure the correct starting conditions.

In considering the operation of the circuit, when the power is first supplied by the closing of the main power switch 12, current flows from the positive terminal 10 through signal means comprising the conductor 14, resistor 105, conductor 106 to junction 113, through the zener diode 114 to the gate electrode 104 of the core presetting SCR 102. This current is sufficient to turn on SCR 102. A core presetting circuit may now be traced from the positive conductor 14, junction 15, choke 16, the right-hand portion of primary winding 17, conductor 91, junction 92, conductor 93, current limiting resistor 100, and through the SCR 102 from anode 101 to cathode 103 and then through negative conductor 34 to the negative terminal 11. This circuit presets the flux of the core of transformer 20 for a proper start. The resistor 100 limits the current flowing through the circuit during this initial operation and little voltage is induced in the secondary windings.

Trigger pulses are generated by a conventional relaxation oscillator timing means comprising the uni-junction transistor 72, resistor 43, resistor 70, capacitor 66, and resistor 75. When the power is initially applied, however, the capacitor 47 is connected in parallel with the capacitor 66 to delay or substantially increase the first period before trigger action for example, by a factor of 10. This is done to allow sufficient time for the preconditioning of the core of output transformer 20.

Capacitor 47 is placed in parallel with capacitor 66 by rendering transistor 52 conductive. A voltage divider path can be traced from the positive conductor 14 at junction 27 through resistors 30, 35, and 37 to junction 40. The positive potential developed across resistor 37 is applied through resistor 57 and is sufficient to render the base 54 positive with respect to emitter 53 thus maintaining transistor 52 conductive. During this initial period of time, the uni-junction transistor 72 is nonconductive and transistor 60 is also nonconductive.

When the voltage charge on capacitors 66 and 47 becomes sufficiently high, the UJT 72 fires, the capacitor 66 discharging from emitter 74 to base $b_1$ 73 and through resistor 75. A current also flows down through resistors 30 and 70 and through the UJT from base 71 to base 73 and through resistor 75 to the junction 76. A positive going pulse is thereby provided at the junction 77. The positive pulse at junction 77 is effective to turn on transistor 60 thereby shorting out and discharging capacitor 47 through the collector-emitter path of transistor 60. This is done to reduce the duration of the trigger pulse which would otherwise be 10 times as long as the normal trigger pulse due to the charge on capacitor 66 alone. The blocking diode 64 prevents the capacitor 66 from discharging through the conducting transistor 60.

The first trigger pulse is also utilized to fire SCR 84 in the following manner. The positive trigger pulse at junction 77 is applied through conductors 137 and 135, then through the parallel combination of capacitor 168 and resistor 166, through diode 170, from base 134 to emitter 131 of transistor 132 and then through conductor 130 to the gate electrode 86 of SCR 84 to render it conductive. With SCR 84 conductive, the full D.C. supply potential is thus applied across the left-hand portion of winding 17 and the first half cycle is initiated. With the cycle initiated and the current flowing through the left-hand portion of winding 17, voltages are induced on the secondary windings 21 through 26.

The voltage induced across winding 25 is rectified by full-wave rectifier 162 and charges capacitor 168 to a voltage level greater than the trigger voltage thus preventing succeeding trigger pulses from turning transistor 132 on. The voltage induced in winding 21 is rectified by full-wave rectifier 117 and is effective to render transistor 107 conductive and transistor 52 cut off. This current path may be traced from the positive output terminal 120 of the rectifier 117 through conductor 121, from base 110 to emitter 111 of transistor 108 thus rendering it conductive, the circuit then continuing through conductor 34 to junction 40, through resistor 37, to junction 36, and then through resistor 123 to the negative terminal 122 of rectifier 117. The voltage drop across resistor 37 is in a polarity direction to turn and hold transistor 52 off which effectively removes capacitor 47 from the relaxation oscillator trigger circuit. The conduction of transistor 108 shorts the right-hand end of resistor 105 to the negative conductor 34 to prevent any further firing of the SCR 102.

The voltages induced on windings 24 and 26 are effective to charge capacitors 157 and 177, respectively. The phasing of these windings is such that transistor 142 is rendered conductive while SCR 84 is conducting and transistor 132 is rendered conductive when SCR 96 is conducting. The purpose of this arrangement is to prepare the steering circuit to steer the pulse so that the succeeding trigger pulse will be directed to the "off" SCR. Thus during the first half cycle the capacitor 177 will be charged with terminal 175 positive with respect to terminal 171 and as soon as the voltage on the capacitor exceeds the zener breakdown voltage of zener diode 176, a current flows from base to emitter of transistor 142 to render it conductive.

The circuit is now prepared for the second triggering pulse which will initiate the second half cycle of operation of the oscillator. Transistor 132 is biased to cut off by the voltage from winding 24; the voltage on capacitor 168 is sufficient to prevent the trigger pulse from passing therethrough, and transistor 142 is conducting. Thus when the relaxation oscillator fires a second time, the pulse feeds from the junction 77 through conductor 145, through conductive transistor 142 from collector 143 to emitter 141 and through the conductor 140 to the gate electrode 97 of SCR 96 to render it conductive.

During the first half cycle of operation the voltage across the left-hand portion of winding 17 has induced substantially equal voltage in the right-hand portion of the winding so that the voltage charge across commutating capacitor 99 is approximately equal to twice the D.C. input voltage. Thus when SCR 96 is rendered conductive and the full supply voltage appears across the right-hand portion of winding 17, the commutating voltage on capacitor 99 is sufficient to extinguish SCR 84. The voltages then reverse on windings 24 and 26 such that transistor 132 is rendered conductive and 142 is cut off thus readying the circuit for the succeeding trigger pulse. During the second half cycle when SCR 96 is conductive, it is effective to short out SCR 102 thereby extinguishing it. SCR 102 then remains off as long as the transistor 108 is conductive.

The RC lag circuits comprising capacitor 157 and resistor 153 and capacitor 177 and resistor 174 cause a sufficient lag in switching the transistors 132 and 142 such that the trailing edge of the trigger pulse has been dissipated. The blocking diode 155 is employed to prevent the first trigger pulse from being lost in the transistor 132 switching current. The zener diode 176 holds transistor 142 off while capacitor 177 is charging and is necessary mainly for the first trigger pulse when the capacitor 177 has no initial reverse charge.

Thus we have disclosed and described a silicon controlled rectifier inverter circuit having a starting circuit which presets the core of the output transformer in a desired direction and which initially fires a predetermined one of the silicon controlled rectifiers such that proper oscillating conditions are obtained.

Many changes and modifications of this invention will undoubtedly occur to those who are skilled in the art; and I, therefore, wish it to be understood that I intend to be limited by the scope of the appended claims and not by the specific embodiment of my invention which is disclosed herein for the purpose of illustration.

I claim:

1. Semiconductor apparatus for converting a source of direct current to alternating current, comprising: first and second controlled rectifiers each having an input electrode, an output electrode and a control electrode; a source of direct current potential; transformer means comprising a core, a primary winding and output means; connection means including said primary winding connecting said source to said input electrodes and to said output electrodes of said first and second controlled rectifiers; current control means having a control element, said current control means connected intermediate said source and said transformer means; signal means connected to said control element of said current control means to cause it to conduct current therethrough immediately upon application of potential from said source to cause a predetermined preset of the flux in the core of said transformer means; timing means energized from said source for subsequently producing periodic pulses to the control electrodes of said first and second controlled rectifiers to alternately fire the first and second controlled rectifiers in response thereto to provide an alternating type current in said transformer means.

2. Semiconductor apparatus for converting a source of direct current to alternating current, comprising: first and second controlled rectifiers each having an input electrode, an output electrode and a control electrode; a source of direct current potential having a pair of terminals; transformer means comprising a core, a tapped primary winding and a secondary winding; connection means including switch means directly connecting said input electrodes to one terminal of said source and connecting the other terminal of said source to said primary winding tap and connecting the first and second extremities of said primary winding, respectively, to the output electrodes of said first and second controlled rectifiers; commutating capacitor means connected between the output electrodes of said first and second controlled rectifiers; current control means having a control element, said current control means connected intermediate said one source terminal and said winding second extremity; signal means connected to said control element of said current control means to cause it to conduct current therethrough immediately upon closing of said switch means to cause a predetermined preset of the flux in the core of said transformer means; timing means energized from said source for producing periodic pulses to the control electrodes of said first and second controlled rectifiers to alternately fire the first and second controlled rectifiers in response thereto to provide an alternating type current in said transformer means.

3. Semiconductor apparatus for converting a source of direct current to alternating current, comprising: first and second controlled rectifiers each having an input electrode, an output electrode and a control electrode; transformer means comprising a core, a tapped primary winding and secondary winding means; a source of direct current potential having a pair of terminals; means connecting said input electrodes to one terminal of said source; means connecting the other terminal of said source to said primary winding tap and connecting the first and second extremities of said primary winding, respectively, to the output electrodes of said first and second controlled rectifiers; current control means having a control element, said current control means connected intermediate said one source terminal and said winding second extremity; signal means connected to said control element of said current control means to cause it to conduct current therethrough immediately upon application of potential from said source to provide a predetermined preset of the core of said transformer means; and timing means energized from said source for producing periodic pulses to the control electrodes of said first and second controlled rectifiers to alternately fire the first and second controlled rectifiers in response thereto to provide an alternating type current in said transformer means.

4. Semiconductor apparatus for converting a source of direct current to alternating current, comprising: first and second controlled rectifiers each having an input electrode, an output electrode and a control electrode; a source of direct current potential having a pair of terminals; means directly connecting said input electrodes to one terminal of said source; commutating capacitor means connected between the output electrodes of said first and second controlled rectifiers; transformer means comprising a core, a tapped primary winding and secondary winding means; means connecting the other terminal of said source to said primary winding tap and connecting the first and second extremities of said primary winding, respectively, to the output electrodes of said first and second controlled rectifiers; current control means having a control element, said current control means connected intermediate said one source terminal and said winding second extremity; signal means connected to said control element of said current control means to cause it to conduct current therethrough immediately upon application of potential from said source to cause a predetermined preset of the core of said transformer means; timing means energized from said source for producing periodic pulses to the control electrodes of said first and second controlled rectifiers to alternately fire the first and second controlled rectifiers in response thereto to provide an alternating type current in said transformer means.

5. Semiconductor apparatus for converting a source of direct current to alternating current, comprising: first and second controlled rectifiers each having an input electrode, an output electrode and a control electrode; a source of direct current potential having a pair of terminals; transformer means comprising a core, a tapped primary winding and secondary winding means; connecting means directly connecting said input electrodes to one terminal of said source and connecting the other terminal of said source to said primary winding tap and connecting the first and second extremities of said primary winding, respectively, to the output electrodes of said first and second controlled rectifiers; third controlled rectifier means having a control element, said third controlled rectifier means connected intermediate said one source terminal and said winding second extremity; signal producing means connected to said control element of said third controlled rectifier means to cause it to conduct current therethrough immediately upon closing of said connection means to cause a predetermined preset of the flux of the core of said transformer means; timing means energized from said source for producing periodic pulses to the control electrodes of said first and second controlled rectifiers to alternately fire the first and second controlled rectifiers in response thereto to provide an alternating type current in said transformer means.

6. Semiconductor apparatus for converting a source of direct current to alternating current, comprising: first, second and third controlled rectifiers each having an input electrode, an output electrode and a control electrode; a source of direct current potential having a pair of terminals; commutating capacitor means connected between the output electrodes of said first and second controlled rectifiers; transformer means comprising a core, a tapped primary winding and secondary winding means; means including switch means directly connecting said input electrodes to one terminal of said source and connecting the other terminal of said source to said primary winding tap and connecting the first and second extremities of said primary winding, respectively, to the output electrodes of said first and second controlled rectifiers; means connecting the output electrode of said third controlled rectifier to said winding second extremitiy; means connected to the control electrode of said third controlled rectifier to cause it to fire immediately upon closing of said switch means to cause a predetermined preset of the flux of said core of said transformer means; timing means energized from said source for producing periodic pulses to the control electrodes of said first and second controlled rectifiers to alternately fire the first and second controlled rectifiers in response thereto to provide an alternating type current in said transformer means.

7. Semiconductor apparatus for converting a source of direct current to alternating current, comprising: first, second and third controlled rectifiers each having an input electrode, an output electrode and a control electrode; a source of direct current potential; means for connecting said input electrodes to one terminal of said source and for connecting the other terminal of said source to said primary winding tap; transformer means comprising a core, a tapped primary winding and a plurality of secondary windings; means connecting the first and second extremities of said primary winding, respectively, to the output electrodes of said first and second controlled rectifiers whereby conduction of said first controlled rectifier causes flux in said core to move towards saturation in a first direction and conduction of said second controlled rectifier causes flux in said core to move towards saturation in the opposite direction; means connecting the output electrode of said third controlled rectifier to said primary winding second extremity; circuit means connected to the control electrode of said third controlled rectifier to cause it to fire immediately upon application of power from said source to cause a present of the flux of said core of said transformer means; and timing means connected to and energized from said source for producing periodic output pulses, the output pulses connected to the control electrodes of said first and second controlled rectifiers to initially fire said first controlled rectifier and to thereafter alternately fire the second and first controlled rectifiers in response to said periodic pulses to provide an alternating type current in said transformer means.

8. Semiconductor apparatus for converting a source of direct current to alternating current, comprising: first second and third controlled rectifiers each having an input electrode, an output electrode and a cotnrol electrode; a source of direct current potential; means including switching means directly connecting said input electrodes to one terminal of said source and connecting the other terminal of said source to said primary winding tap; commutating capacitor means connected between the output electrodes of said first and second controlled rectifiers; transformer means comprising a saturable core, a tapped primary winding and a plurality of secondary windings; means connecting the first and second extremities of said primary winding, respectively, to the output electrodes of said first and second controlled rectifiers whereby conduction of said first controlled rectifier causes flux in said core to approach saturation in a first direction and conduction of said second controlled rectifier causes flux in said core to approach saturation in the opposite direction; means connecting the output electrode of said third controlled rectifier to said primary winding second extremity; circuit means connected to the control electrode of said third controlled rectifier to cause it to fire immediately upon closing of said switch means to cause a preset of the flux of said core of said transformer means towards saturation in said opposite direction; and timing means connected to and energized from said source for producing periodic output pulses, the output pulses connected to the control electrodes of said first and second controlled rectifiers to initially fire said first controlled rectifier and to thereafter alternately fire the second and the first controlled rectifiers in response to said periodic pulses to provide an alternating type current in said transformer means.

9. Semiconductor apparatus for converting a source of direct current to alternating current, comprising: first, second and third controlled rectifiers each having an input electrode, an output electrode and a control electrode; transformer means comprising a core, a tapped primary winding and a plurality of secondary windings; a source of direct current potential; means connecting said source to said input electrodes and to said primary winding tap and connecting the first and second extremities of said primary winding, respectively, to the output electrodes of said first and second controlled rectifiers whereby conduction of said first controlled rectifier causes flux in said core to approach saturation in a first direction and conduction of said second controlled rectifier causes flux in said core to approach saturation in the opposite direction; means connecting the output electrode of said third controlled rectifier to said primary winding second extremity; transformer core presetting circuit means connected to the control electrode of said third controlled rectifier to cause it to fire immediately upon application of potential from said source to cause a preset of the flux of said core of said transformer means; and timing means connected to and energized from said source for producing periodic output pulses, the output pulses connected to the control electrodes of said first and second controlled rectifiers to provide a pulse to initially fire said first controlled rectifier after said preset and to thereafter alternately fire the second and first controlled rectifiers in response thereto to provide an alternating type current in said transformer means.

10. Semiconductor apparatus for converting a source of direct current to alternating current, comprising: first, second and third controlled rectifiers each having an input electrode, an output electrode and a control electrode; a source of direct current potential; means directly connecting said input electrodes to one terminal of said source; commutating capacitor means connected between the output electrodes of said first and second controlled rectifiers; transformer means comprising a saturable core, a tapped primary winding and a plurality of secondary windings; means connecting the other terminal of said source to said primary winding tap and connecting the first and second extremities of said primary winding, respectively, to the output electrodes of said first and second controlled rectifiers whereby conduction of said first controlled rectifier causes flux in said core to approach saturation in a first direction and conduction of said second controlled rectifier causes flux in said core to approach saturation in the opposite direction; means connecting the output electrode of said third controlled rectifier to said primary winding second extremity; transformer core presetting circuit means connected to the control electrode of said third controlled rectifier to cause it to fire immediately upon application of potential from said source to cause a preset of the flux of said core of said transformer means towards saturation in said opposite direction; timing means connected to and energized from said source for producing periodic output pulses, the output pulses connected to the control electrodes of said first and second controlled rectifiers to provide a pulse to initially fire said first controlled rectifier after said preset and to thereafter alternately fire the second and first controlled rectifiers in response thereto to provide an alternating type current in said transformer means.

11. Semiconductor apparatus for converting a source of direct current to alternating current, comprising: first, second and third controlled rectifiers each having an input electrode, an output electrode and a control electrode; a source of direct current potential; means directly connecting said input electrodes to one terminal of said source; commutating capacitor means connected between the output electrodes of said first and second controlled rectifiers; transformer means comprising a saturable core, a tapped primary winding and a plurality of secondary windings; means including switch means connecting the other terminal of said source to said primary winding tap and connecting the first and second extremities of said primary winding, respectively, to the output electrodes of said first and second controlled rectifiers whereby conduction of said first controlled rectifier causes flux in said core to approach saturation in a first direction and conduction of said second controlled rectifier causes flux in said core to approach saturation in the opposite direction; means connecting the output electrode of said third controlled rectifier to said primary winding second extremity; circuit means connected to the control electrode of said third controlled rectifier to cause it to fire immediately upon closing of said switch means to cause a preset of the flux of said core of said transformer means towards saturation in said opposite direction; and timing means energized from said source for producing periodic pulses and connected to the control electrodes of said first and second controlled rectifiers to initially fire said first controlled rectifier and to thereafter alternately fire the second and first controlled rectifiers in response to said periodic pulses to provide an alternating type current in said transformer means.

12. Semiconductor apparatus for converting a source of direct current to alternating current, comprising: first and second controlled rectifiers each having an input electrode, an output electrode and a control electrode; a source of direct current potential; transformer means comprising a core, a tapped primary winding and output means; connection means connecting said source to said input electrodes and to said primary winding tap and connecting the first and second extremities of said primary winding, respectively, to the output electrodes of said first and second controlled rectifiers; current control means having a control element, said current control means connected intermediate said source and said winding second extremity; signal producing means connected to said control element of said current control means to cause it to conduct current therethrough immediately upon application of potential from said source to cause a predetermined preset of the flux of the core of said transformer means; pulse producing timing means, having a first delayed timing period and a normal timing period, energized from said source for initially producing a pulse in accordance with said delayed timing period in order to allow sufficient time for said core preset and thereafter producing periodic pulses in accordance with said normal timing period to the control electrodes of said first and second controlled rectifiers to alternately fire the first and second controlled rectifiers in response thereto to provide an alternating type current in said transformer means.

13. Semiconductor apparatus for converting a source of direct current to alternating current, comprising: first and second controlled rectifiers each having an input electrode, an output electrode and a control electrode; a source of direct current potential; transformer means comprising a core, a tapped primary winding and output means; connection means including said primary winding connecting said source to said input electrodes and to said output electrodes of said first and second controlled rectifiers; current control means having a control element, said current control means connected intermediate said source and said transformer winding; signal producing means connected to said control element of said current control means to cause it to conduct current therethrough immediately upon closing of said connection means to cause a predetermined preset of the flux of the core of said transformer means; timing means energized from said source for producing periodic pulses; pulse steering means responsive to and controlled by the induced potential on said transformer means for selectively connecting said periodic pulses to the control electrode of the then nonconducting first and second controlled rectifiers to alternately fire the first and second controlled rectifiers in response thereto to provide an alternating type current in said transformer means.

14. Semiconductor apparatus for converting a source of direct current to alternating current, comprising: first and second controlled rectifiers each having an input electrode, an output electrode and a control electrode; a source of direct current potential; transformer means comprising a core, a tapped primary winding and output means; connection means including said primary winding connecting said source to said input electrodes and to said output electrodes of said first and second controlled rectifiers; current control means having a control element, said current control means connected intermediate said source and said transformer winding; signal producing means connected to said control element of said current control means to cause it to conduct current therethrough immediately upon closing of said connection means to cause a predetermined preset of the flux of the core of said transformer means; timing means energized from said source for producing periodic pulses; pulse steering means intermediate said timing means and said control electrodes for selectively connecting said periodic pulses to the control electrode of the then nonconducting first and second controlled rectifiers to alternately fire the first and second controlled rectifiers in response thereto to provide an alternating type current in said transformer means.

15. Semiconductor apparatus for converting a source of direct current to alternating current, comprising: first and second controlled rectifiers each having an input electrode, an output electrode and a control electrode; a source of direct current potential; transformer means comprising a core, a tapped primary winding and output means; connection means including said primary winding connecting said source to said input electrodes and to said output electrodes of said first and second controlled rectifiers; current control means having a control element, said current control means connected intermediate said source and said transformer winding; signal producing means connected to said control element of said current control means to cause it to conduct current therethrough immediately upon closing of said connection means to cause a predetermined preset of the flux of the core of said transformer means; timing means energized from said source for producing periodic pulses; pulse steering means comprising switching means for selectively connecting said periodic pulses to the control electrode of the then nonconducting first and second controlled rectifiers to alternately fire the first and second controlled rectifiers in response thereto to provide an alternating type current in said transformer means.

References Cited in the file of this patent

UNITED STATES PATENTS

| | | |
|---|---|---|
| 2,872,635 | Lawn | Feb. 3, 1959 |
| 2,883,539 | Bruck et al. | Apr. 21, 1959 |
| 2,959,725 | Younkin | Nov. 8, 1960 |
| 3,010,062 | Van Emden | Nov. 21, 1961 |